Figure 1:
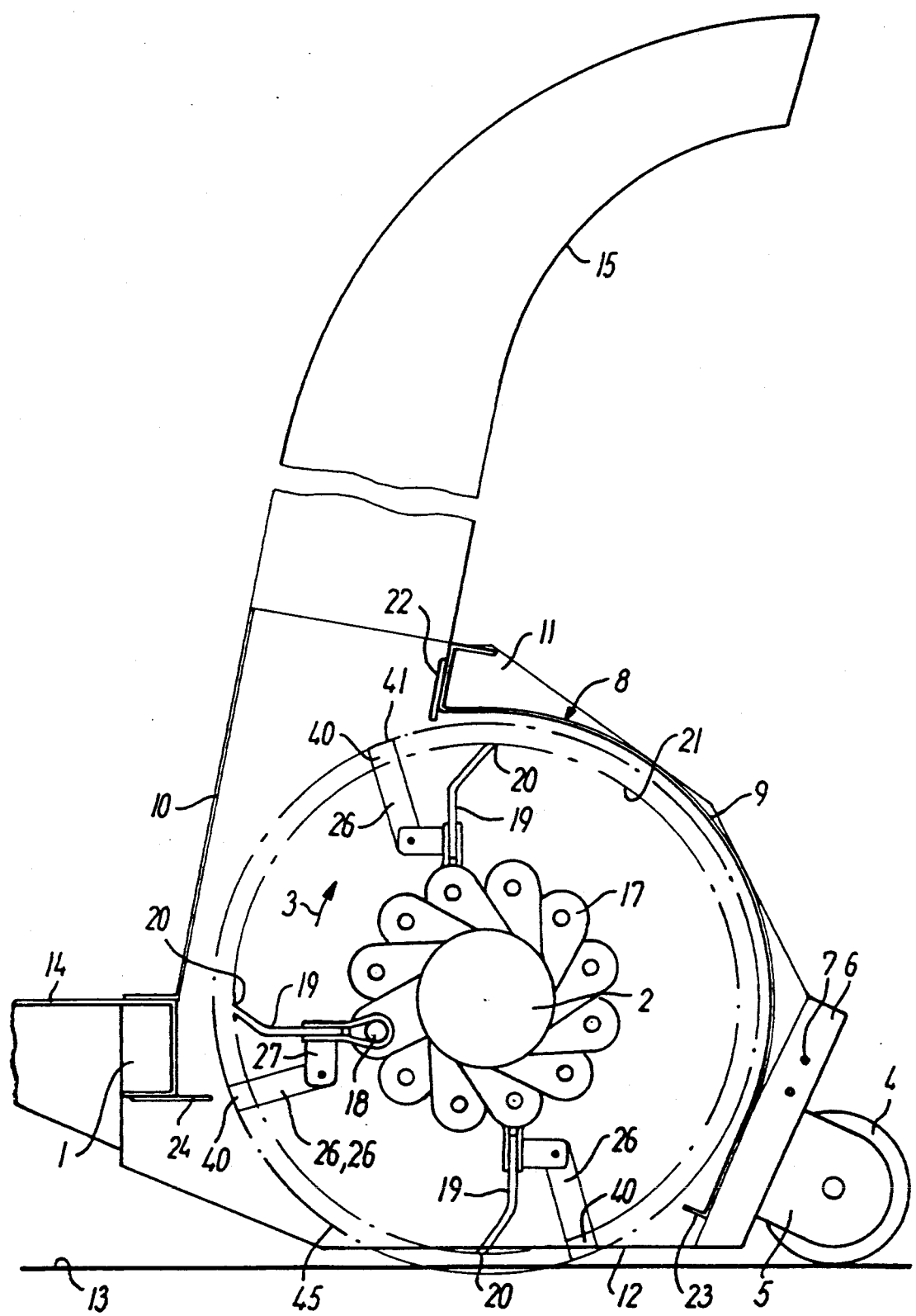

United States Patent [19]

Jacobsen

[11] Patent Number: 5,056,304
[45] Date of Patent: Oct. 15, 1991

[54] APPARATUS FOR MOWING GRASS OR SIMILAR VEGETATION

[75] Inventor: Arne Jacobsen, Herlufmagle, Denmark

[73] Assignee: Spragelse Maskinfabrik AS, Herlufmagle, Denmark

[21] Appl. No.: 555,465
[22] PCT Filed: Feb. 22, 1989
[86] PCT No.: PCT/DK89/00041
§ 371 Date: Oct. 17, 1990
§ 102(e) Date: Oct. 17, 1990
[87] PCT Pub. No.: WO89/07882
PCT Pub. Date: Sep. 8, 1989
[51] Int. Cl.⁵ ............................................. A01D 34/62
[52] U.S. Cl. .............................. 56/251.0; 56/DIG. 20; 172/21
[58] Field of Search .................. 56/251, 1, 16.4, 294, 56/DIG. 17, DIG. 20; 172/21, 27, 28

[56] References Cited
U.S. PATENT DOCUMENTS

| | | |
|---|---|---|
| 2,520,488 | 8/1950 | Batchelder ........................... 56/16.7 |
| 2,827,751 | 3/1958 | Mascaro ................................ 56/294 |
| 3,093,951 | 6/1963 | Barows et al. ...................... 56/12.7 |
| 3,417,557 | 12/1968 | Brewer ................................. 56/294 |
| 3,452,823 | 7/1969 | Shapland, Jr. ....................... 172/21 |
| 3,460,629 | 8/1969 | Shapland, Jr. et al. .............. 172/21 |
| 4,267,891 | 5/1981 | van der Lely et al. .............. 172/28 |

Primary Examiner—Terry L. Melius
Attorney, Agent, or Firm—Watson, Cole, Grindle & Watson

[57] ABSTRACT

An apparatus is provided for mowing grass and similar vegetation. The apparatus has a frame (1), in which a horizontal shaft (2) is rotatably mounted, the shaft (2) extending horizontally in the position of use. Swingles (19) are provided along and around the shaft (2), these swingles (19) being pivotably connected with the shaft for rotation about axes extending substantially parallel to the shaft. The swingles are terminated at their outer ends by edges (20), extending substantially parallel to the shaft (2). In order to make the apparatus operative for airing the grass field or lawn in addition to the mowing of grass, at least some of the swingles (19) carry tilling elements (26) for producing airing openings or grooves in the soil.

6 Claims, 4 Drawing Sheets

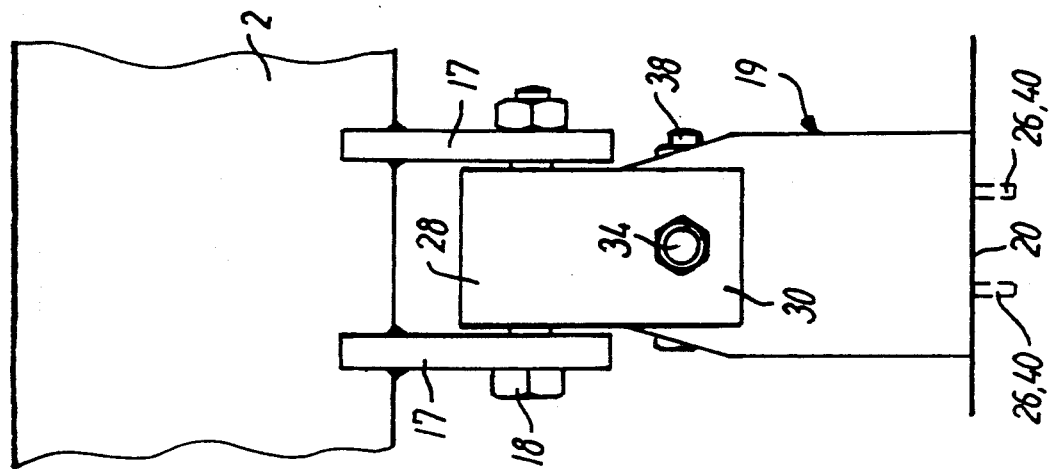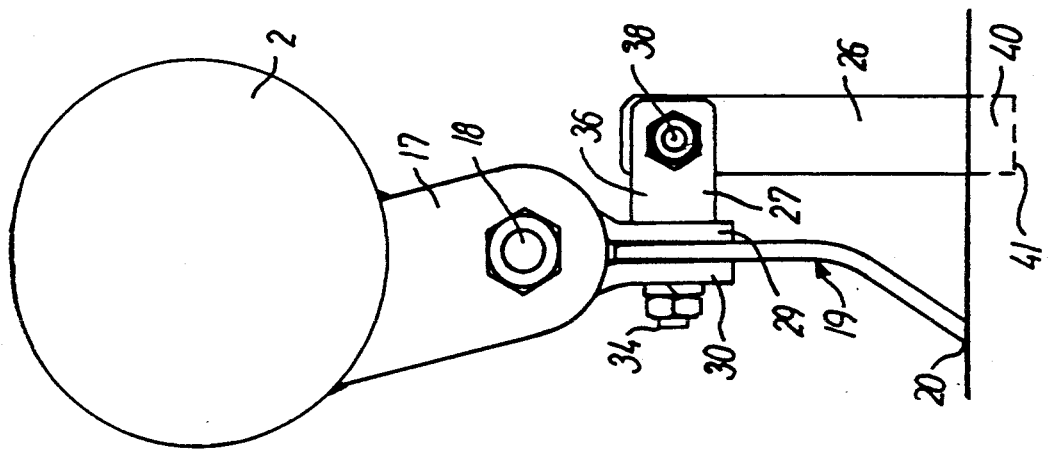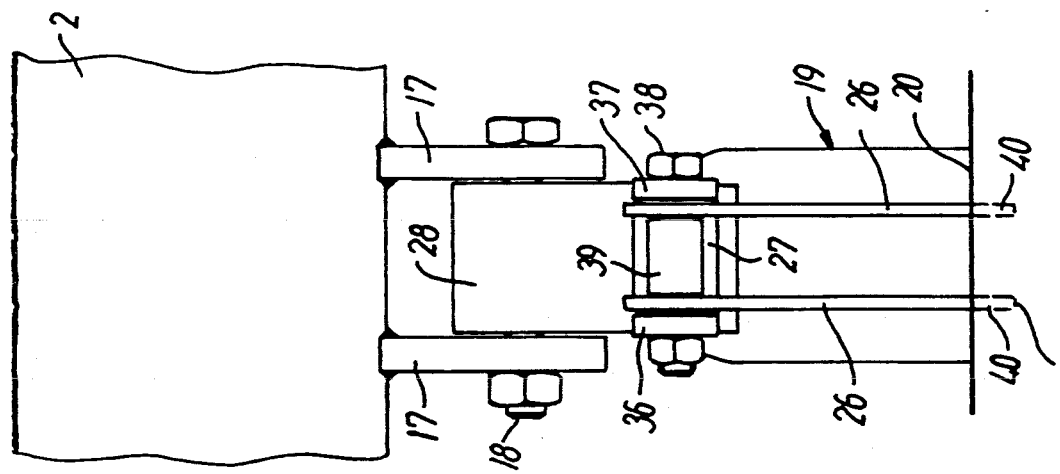

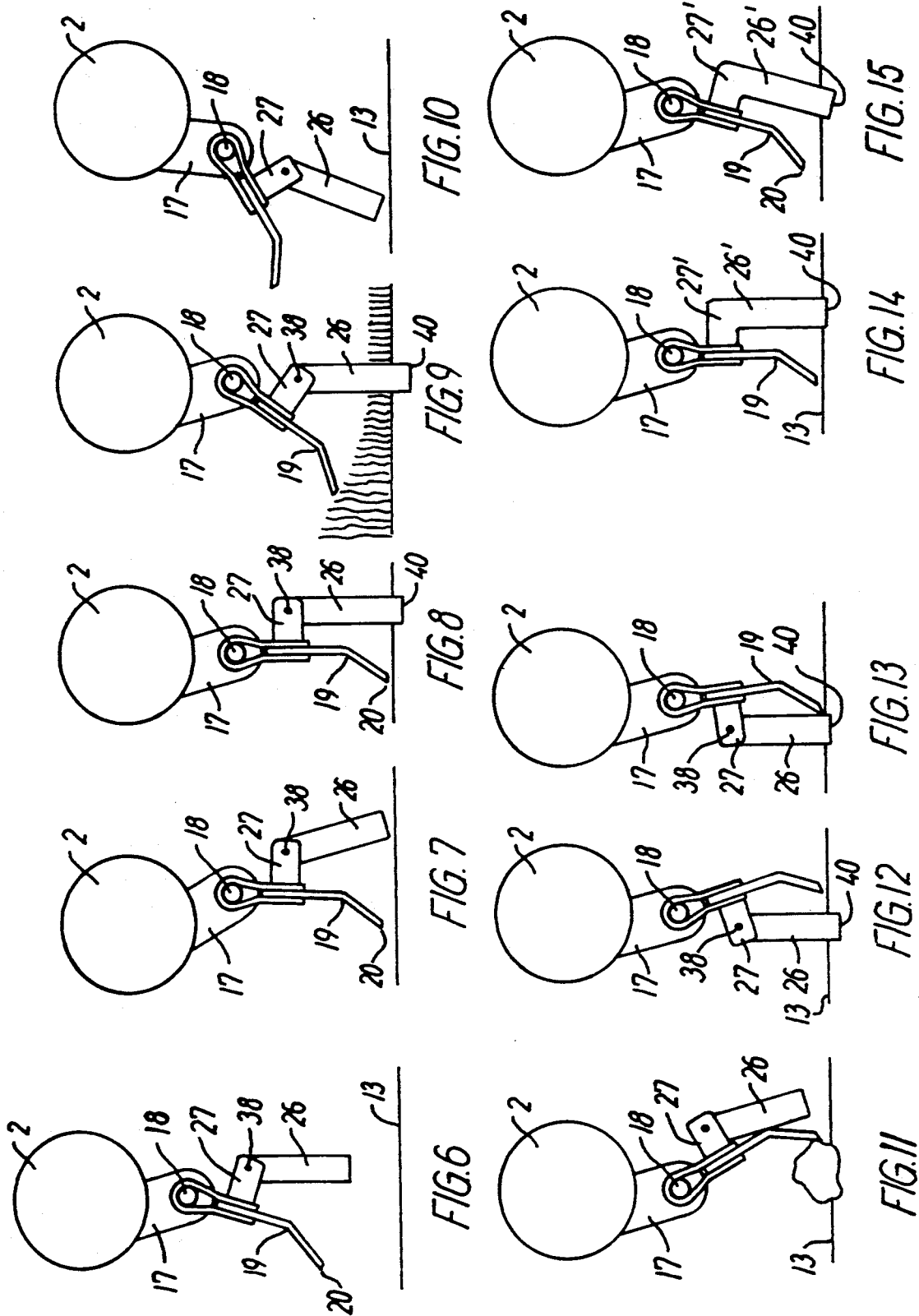

APPARATUS FOR MOWING GRASS OR SIMILAR VEGETATION

This invention relates to an apparatus for mowing grass or similar vegetation, comprising a frame, a shaft rotatably mounted in said frame in such a manner as to extend substantially horizontally in the position of use of the apparatus, a plurality of swingles being provided along and around said shaft, said swingles being rotatably connected with said shaft for rotation about axes substantially parallel to said shaft and being constructed at their outer ends with edges for cutting the grass or similar vegetation.

Apparatus of the kind referred to are primarily known in connection with the harvesting of green crops to be used for silage, e.g. beet tops. These apparatus are well known within agriculture under the denomination forage harvesters. Such apparatuses are known e.g. from US-A-3.417.557 and US-A-3.093.951.

It has been found, however, that apparatus of the kind referred to are also suitable for the mowing of grass, seeing that they work fast and efficiently and give e.g. park lawns an attractive appearance. At the same time they have the advantage that, by virtue of the swingles, they are capable of throwing or blowing the cut-off grass upwards through the pipes with which apparatus of this kind are usually provided, so that the grass can be loaded into an accompanying vehicle. Moreover, it has been found that these apparatus are also suitable for the cultivation of areas having a high growth of grass or weeds. They can therefore be used for the cutting of the so-called rough of golf courses and, obviously, for the cutting of grass on fairways.

It is the object of the invention to provide an apparatus of the kind referred to which has improved working properties, and to achieve this object, according to the invention, at least some of the swingles carry tilling elements for producing airing openings or grooves in the soil. Hereby the advantage is obtained that the apparatus, while operating to cut grass, can at the same time be used for performing a tilling operation of the grass area considered substantially corresponding to the tilling operation known as vertical cutting. Moreover, this property is obtained in a particularly simple and convenient manner, seeing that no additional suspending means are required on the shaft for suspending the said tilling elements, seeing that these are carried by the associated swingles.

According to the invention, the tilling elements may advantageously comprise a plate-shaped tilling portion, the plane of which is substantially perpendicular to the shaft. Thereby, the tilling elements will be capable of producing rather narrow grooves in the soil or in the grass roots so as to provide an efficient airing.

According to a relatively simple embodiment of the apparatus according to the invention the tilling elements comprise pieces of flat steel bars, one end of which, in the working position, extends radially beyond said edge of the respective swingle.

A particularly advantageous embodiment of the apparatus according to the invention is characterized in that the tilling elements are pivotably suspended in brackets for rotation about axes that are substantially parallel to the shaft, and that the said brackets protrude rearwardly from the respective swingles, as seen in the direction of rotation of the shaft. Hereby a lever effect can be obtained, which is advantageous in connection with the depression of the tilling elements into the soil or grass roots.

Figure 2:
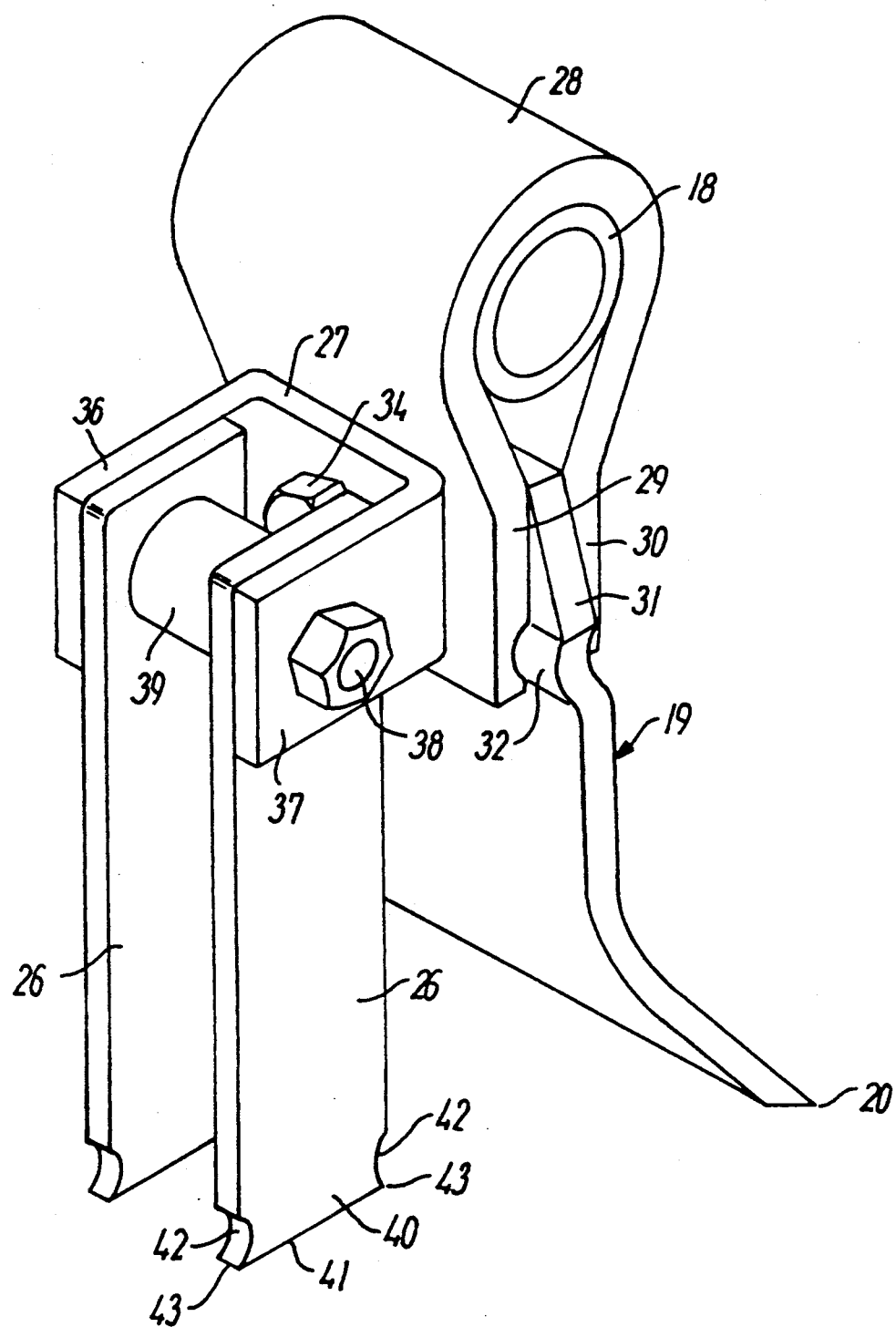

The invention will now be explained in further detail with reference to the drawing, in which FIG. 1 diagrammatically shows a vertical section through an embodiment of the apparatus according to the invention, in side view, FIG. 2 is a perspective view of a swingle with associated tilling elements, FIGS. 3, 4 and 5 show a swingle substantially corresponding to that of FIG. 2, as suspended on a shaft, as seen in rear view, side view and front view, respectively, FIG. 6 is a picture illustrating the position, which a swingle with tilling elements according to FIG. 2 will assume when the swingle in question and the associated tilling elements are just freely rotated, FIGS. 7, 8, 9 and 10 are pictures for illustrating the manner of operation of the swingle with tilling elements shown in FIG. 2, FIG. 11 is a picture for illustrating the swingle in question and the associated tilling elements in case the swingle hits a stone, FIGS. 12 and 13 are two pictures for illustrating a modified embodiment of the apparatus according to the invention and its manner of operation, and FIGS. 14 and 15 two pictures of a still further embodiment of the apparatus according to the invention and illustrating its manner of operation.

In the drawing, 1 is a frame in which a hollow shaft 2 is rotatably mounted. In the working position of the apparatus, as illustrated in FIG. 1, the shaft 2 extends horizontally and is supported relative to the frame 1 by two end journals, not shown. The shaft is also provided with coupling means so that the shaft can be driven in the direction of rotation indicated by an arrow 3. The frame 1 also carries a roller 4, which is supported by a pair of brackets 5, of which only the frontmost one is shown. The brackets are suspended in a slide, which is adjustable in a profiled steel bar 6, which is provided with holes 7 so that the roller 4 can be adjusted in different heights relative to the frame 1. The shaft is arranged inside a housing or hood 8 comprising a screen portion 9, which is shaped as part of a cylinder and encircles the shaft along approximately 150°. At its front end, the frame 1 carries a substantially plane screen 10, and at both ends the hood is provided with a screen, only the screen 11 facing inwards in the plane of the drawing being shown, the other screen being removed in order to provide a view into the apparatus. The side screens are 11 are terminated at the bottom by a substantially horizontal edge 12, the height of which above the surface of the soil 13 can be adjusted in the manner explained by displacement of the roller 4.

Moreover, the frame 1 is provided at its front with traction means 14 which are shown purely diagrammatically and which in a manner known per se serve to couple the apparatus to a traction vehicle, e.g. a tractor.

The hood formed by the screens 9, 10 and 11 is provided at its top with an ejection pipe 15, the upper end of which is curved backwards. This end can be provided with a movable chute for directing the ejected harvested material into a cart which can be coupled to the apparatus shown or to a driving tractor in a manner known per se.

The shaft 2 carries arms 17 arranged in pairs. These pairs of arms are distributed in the longitudinal direction of the shaft 2 and along the circumference of the shaft, preferably in such a manner that the pairs of arms 17 form two helices starting at opposite ends of the shaft and meeting at the middle of the shaft, the helices being right and left turned, respectively.

Each pair of arms 17 carries a shaft 18, and each of these shafts carries a swingle 19. In FIG. 1, a considerable number of swingles are omitted for clarity of illustration, but it will be understood that these swingles are provided on the shaft 2 approximately in the full length thereof.

These swingles have outer ends which are constructed for cutting grass, and in the example shown they are terminated by edges 20 extending substantially parallel to the shaft 2, and such that when the shaft 2 rotates these edges 20 sweep an imaginary cylindrical surface, which is shown in the drawing in the form of a dash-dotted circle 21.

At the upper and lower ends of the screen 9 horizontal steel bars 22 and 23, respectively, are provided, and moreover, the frame 1 carries a horizontal steel bar 24 in front of the shaft. The steel bar 24 constitutes a form of counter stop for the swingles and at the same time provides a suitable termination at the front of the hood 8. Also the bar 23 forms a kind of termination of the hood so that the driving effect, which the swingles exert on the cut-off grass, can be utilized at a maximum for throwing the grass up through the pipe 15. At the same time the swingles provide a certain centrifugal effect, which contributes to this ejection.

In the embodiment of the apparatus according to the invention shown in FIG. 1, each swingle 19 carries a set of tilling elements 26, which are pivotably supported relatively to the associated swingle 19 by means of a bracket 27.

The construction of a swingle with associated tilling means is seen more clearly in FIG. 2. As will be seen, the swingle 19 is carried by a piece of flat steel bar 28, which is bent to an approximate U-shape, the branches 29 and 30 being, however, pressed towards one another in order to receive the upper end 31 of the working portion of the swingle 19 itself. To secure the working portion against unintentional turning, it has a small pressed-up portion 32. The swingle as such is held relatively to the U-shaped member 28 by means of a bolt with associated nut 34, which at the same time serves for the fastening of the bracket 27. As is apparent from FIG. 2, the bracket has two arms 36 and 37 so that the bracket as a whole is substantially U-shaped. Between the arms 36 and 37 the two tilling elements 26,26 are suspended by means of a shaft 38 in the form of a bolt with associated nut, and between the two tilling elements 26 a spacing tube 39 is arranged. Each of the tilling elements 26 consists of a piece of flat steel bar, the upper end of which is pivotably suspended in the manner described, and the lower end 40 of which constitutes the working portion proper. Adjacent the bottom edge 41 an arcuate lateral incision 42 is provided in each side of the flat steel bar, whereby a cutting edge portion 43 is formed. The middle of the incisions at the same time provides an indication of the need to exchange the flat steel bar.

The whole construction is suspended by means of the U-shaped member 28 on the associated shaft 18, which is carried by the associated pair of arms 17.

As is apparent from FIG. 1 the bottom edge 41 of the tilling elements will sweep a circle which in the drawing is marked by a dash-dotted circle 45. By comparing the two circles 21 and 45 it will be seen that the lower parts 40 of the tilling elements 26 extend radially outwards from the lower edges or working edges 20 of the swingles. Moreover, it will be seen that the planes of the actual tilling portions 40 of the swingles are perpendicular to the longitudinal direction of the shaft 2.

The operation of the apparatus shown in FIG. 1 will now be explained in detail with reference to FIGS. 6—11. FIG. 6 shows the position, which a swingle and the associated tilling elements assume if the suspending shaft 18 of the swingle in question is in a position directly below the axis of the shaft 2. The swingle with the associated tilling elements will assume a position of equilibrium, in which the swingle points a little forward relatively to radial direction (as seen in relation to the shaft 2), whereas the tilling elements 26 will hang substantially vertically downwards. The swingle and the tilling elements 26 will assume the same relative position when the shaft 2 is rotated in the direction of the arrow 3 (FIG. 1), the centrifugal force taking the place of the force of gravity.

FIG. 7 shows the mutual position of the swingle and the tilling elements immediately before the shaft of suspension 18 of the relevant swingle assumes a position vertically under the longitudinal axis of the shaft 2. This corresponds to the position which these parts assume immediately before the soil is engaged. As is apparent from FIG. 8, the shaft 2 has now been turned a little further in a clock-wise direction, whereby the lower end of the tilling elements 26 has been driven into the soil by a combined striking and lever effect. The striking effect occurs as a consequence of the rotation of the shaft 2, and the lever effect results from the fact that the tilling elements will be impeded by the engagement with the soil, whereas the swingle will continue to move, whereby a torque is produced by means of the rearwardly protruding bracket 27. As a result, the swingle continues moving and cuts grass as diagrammatically shown in FIG. 9, and at the same time the tilling elements will be hurled forward to form grooves in the soil or the grass roots, whereafter the tilling elements leave the soil as illustrated in FIG. 10. FIG. 11 illustrates the incident where a swingle hits a stone, and it will be seen that in that case the swingle has a possibility of evading backwards so as to be able to pass by the stone.

FIGS. 12 and 13 show another embodiment, which corresponds to that described above with the exception that the bracket 27 with associated tilling elements 26 is arranged on the front side of the swingle (as seen in the direction of rotation 3 of the shaft). In this embodiment, when the tilling elements 26 strike the soil, the inertia of the swingle will force the tilling elements 26 forward so that the swingles, besides performing their grass cutting effect, will also exert a pushing effect on the tilling elements 26. Since the speed of rotation of the shaft 2 is relatively high (of the order of 1500 revolutions per minute) it will be understood that the movements performed by the swingle and the tilling elements take place very rapidly. FIG. 12 illustrates the situation where the tilling elements of a swingle have just penetrated into the soil, while FIG. 13 shows the same situation a moment later, viz. where the swingle has abutted the tilling elements 26 as explained.

In the embodiment of FIGS. 14 and 15, each swingle is connected with two tilling elements 26', like previously described, but each tilling element consists of an angular plate structure, where the upper short leg 27' thus replaces the bracket 27. In this embodiment, FIG.

14 shows the situation immediately after the tilling elements have been engaged with the soil, while FIG. 15 illustrates the situation a moment later. Thus, in the last mentioned embodiment, the tilling elements 26' and the associated swingle form a stiff unit, and consequently the full momentum possessed by this stiff unit will contribute to force the lower edges of the tilling elements through the soil.

I claim:

1. Apparatus for mowing grass or similar vegetation, comprising a frame, a shaft rotatably mounted in said frame in such a manner as to extend substantially horizontally in the position of the use of the apparatus, a plurality of swingles provided along and around said shaft, said swingles being rotatably connected with said shaft for rotation about axes substantially parallel to said shaft and being constructed at their outer ends with edges for cutting grass or similar vegetation, and where at least some of the swingles carry tilling elements for producing airing openings or grooves in the soil, the tilling elements having plate-shaped tilling portions substantially perpendicular to the shaft and in the working position extending radially beyond the edge of the respective swingle, wherein the tilling elements are connected with their associated swingles by means of a bracket.

2. Apparatus as in claim 1, wherein the tilling elements are pivotably suspended in their brackets for rotation about axes that are substantially parallel to the shaft.

3. Apparatus as in claim 1, wherein the tilling elements are rigidly connected to their associated swingles.

4. Apparatus as in claim 1, wherein the bracket protrudes rearwardly, as seen in the direction of rotation of the shaft.

5. Apparatus as in claim 1, wherein the bracket protrudes forwardly, as seen in the direction of rotation of the shaft.

6. Apparatus as in claim 1, wherein the plate-shaped tilling portions of the tilling elements are constructed with an accurate incision in each lateral edge adjacent the end of the plate-shaped portion.

* * * * *